(12) United States Patent
Beringer et al.

(10) Patent No.: US 8,131,668 B2
(45) Date of Patent: Mar. 6, 2012

(54) USER-EXPERIENCE-CENTRIC ARCHITECTURE FOR DATA OBJECTS AND END USER APPLICATIONS

(75) Inventors: Joerg Beringer, Los Altos, CA (US); Kai S. Richter, Darmstadt (DE)

(73) Assignee: SAP AG, Walldorf (DE)

(*) Notice: Subject to any disclaimer, the term of this patent is extended or adjusted under 35 U.S.C. 154(b) by 461 days.

(21) Appl. No.: 12/128,453

(22) Filed: May 28, 2008

(65) Prior Publication Data

US 2009/0300060 A1 Dec. 3, 2009

(51) Int. Cl.
*G06F 7/00* (2006.01)

(52) U.S. Cl. ........................................ 707/609

(58) Field of Classification Search ................ None
See application file for complete search history.

(56) References Cited

U.S. PATENT DOCUMENTS

| | | | |
|---|---|---|---|
| 5,754,857 A | 5/1998 | Gadol | |
| 5,826,239 A | 10/1998 | Du et al. | |
| 6,073,109 A | 6/2000 | Flores et al. | |
| 6,640,238 B1 | 10/2003 | Bowman-Amuah | |
| 7,000,219 B2 | 2/2006 | Barrett et al. | |
| 7,096,222 B2 | 8/2006 | Kern et al. | |
| 7,100,195 B1 | 8/2006 | Underwood | |
| 7,219,107 B2 | 5/2007 | Beringer | |
| 7,425,582 B2 | 9/2008 | Baran, Jr. et al. | |
| 7,428,582 B2 | 9/2008 | Bean et al. | |
| 7,451,152 B2 | 11/2008 | Kraft et al. | |
| 2002/0063734 A1 | 5/2002 | Khalfay et al. | |
| 2003/0023472 A1 | 1/2003 | Lee et al. | |
| 2003/0182458 A1 | 9/2003 | Ali et al. | |
| 2004/0046789 A1* | 3/2004 | Inanoria | 345/748 |
| 2005/0027559 A1 | 2/2005 | Rajan et al. | |
| 2006/0149743 A1 | 7/2006 | Mouline et al. | |
| 2006/0200792 A1 | 9/2006 | Hagstrom et al. | |
| 2007/0033194 A1 | 2/2007 | Srinivas et al. | |
| 2007/0033571 A1 | 2/2007 | Moore et al. | |
| 2007/0239503 A1 | 10/2007 | Bhatnagar et al. | |
| 2007/0300185 A1 | 12/2007 | Macbeth et al. | |
| 2008/0004725 A1 | 1/2008 | Wacker | |
| 2008/0082649 A1 | 4/2008 | Gazier et al. | |
| 2008/0140759 A1 | 6/2008 | Connor et al. | |
| 2008/0313650 A1* | 12/2008 | Arnquist et al. | 719/316 |

(Continued)

OTHER PUBLICATIONS

Cardoso, Jorge, "Semantic Web Services: Theory, Tools, and Applications", *Information Science Reference*, Hershey, NY, USA, 2007, (2007), 1-43 and 191-239.

(Continued)

*Primary Examiner* — Truong Vo

(74) *Attorney, Agent, or Firm* — Blakely Sokoloff Taylor & Zafman, LLP

(57) ABSTRACT

Methods and apparatuses enable generation of data objects having properties that reflect business understanding and how the data objects are to be used. A user experience data object ("UX object") is semantically defined by object characteristics including actions, attributes, and relations needed to incorporate the UX object into one or more user interface (UI) contexts. The UI contexts are contexts from which the UX object will be accessed or in which it will be used. One or more UX object usages define object characteristics related to a specific context in which the UX object is to be accessed. A usage has business logic decoupled from the UX object, and is associated with the UX object. The UX object and one or more usages are provided to enable the UX object to be incorporated into a UI component that allows access to the UX object.

8 Claims, 7 Drawing Sheets

U.S. PATENT DOCUMENTS

| | | | |
|---|---|---|---|
| 2009/0063522 | A1 | 3/2009 | Fay et al. |
| 2009/0106645 | A1 | 4/2009 | Knobel |
| 2009/0112924 | A1* | 4/2009 | Harris et al. .............. 707/103 X |
| 2009/0171909 | A1 | 7/2009 | Bank et al. |
| 2009/0260022 | A1 | 10/2009 | Louch et al. |
| 2010/0064229 | A1 | 3/2010 | Lau et al. |
| 2010/0082641 | A1 | 4/2010 | Rinckes et al. |
| 2010/0251133 | A1 | 9/2010 | Beringer et al. |

OTHER PUBLICATIONS

Davies, John, et al., "Towards the Semantic Web Ontology-Driven Knowledge Management", *John Wiley & Sons, LTD*, Chichester, England, 2003, (2003), 1-12 and 91-115.

Shadbolt, Nigel, et al., "The Semantic Web Revisited", *IEEE Intelligent Systems May/Jun. 2006*; Retrieved on Mar. 1, 2009 from http://eprints.ecs.soton.ac.uk/12614/01/Semantic_Web_Revisted.pdf *Published by the IEEE Computer Society*, 2006;, pp. 96-101.

Spivack, Nigel, "Making Sense of the Semantic Web", Nov. 2007; Retrieved from the Web on Mar. 11, 2009: http://novaspivack.typepad.com/nova_spivacks_weblog/files/nova_spivack_semantic_web_talk.ppt, 36 pages.

Non-Final Office Action for U.S. Appl. No. 11/956,086 Mailed Jun. 8, 2010, 19 pages.

Final Office Action for U.S. Appl. No. 11/956,086 Mailed Nov. 24, 2010, 26 pages.

Non-Final Office Action for U.S. Appl. No. 11/803,760 Mailed Dec. 7, 2010, 24 Pages.

Non-Final Office Action for U.S. Appl. No. 12/033,361, Mailed Feb. 17, 2011, 13 pages.

Non-Final Office Action for U.S. Appl. No. 12/411,216, Mailed Mar. 28, 2011, 15 pages.

Hollingsworth, D.: Workflow Management Coalition the Workflow Reference Model, Document No. TC00-1003, Document Status—Issue 1.1, Jan. 19, 1995, 55 Pages.

\* cited by examiner

USER-EXPERIENCE-CENTRIC ARCHITECTURE FOR DATA OBJECTS AND END USER APPLICATIONS

FIELD

Embodiments of the invention relate to user interfaces, and more particularly to data objects and dynamic end user applications that incorporate user expertise and understanding.

BACKGROUND

Work performed with electronic devices is generally performed in an interactive way, where the electronic device (computer, handheld device, wireless device, etc.) presents data to a user for work, and the user performs one or more actions on the data. The user may also create data in an application, which data can then be made part of the system or otherwise be interacted with. The user experience with the work environment and/or the data to be worked includes how the data is presented to the user for interaction.

Many current user interfaces (UIs) are built on a model-view-controller (MVC) based architecture intended to decouple the data model (M), the interaction control (C), and the appearance or view (V). Although such architectures are intended to decouple the different layers of the architecture, there is still dependency between the layers, which weakens the decoupling of the layers. Thus, contrary to what is expected, the reality is that traditional separation in these layers does not make the layers agnostic to each other. Back-end services are built to feed the model of UI-patterns, and the controller supports the behavior of the visual layer. Because of these interdependencies, the enabling of UI-patterns requires sophisticated knowledge about available services and programming skills to integrate the layers. The traditional requirements for knowledge and programming skills results in higher development and maintenance costs to generate multi-modal support. Traditional approaches to the use of MVC have resulted in the creation of applications that are very complex (e.g., end user modeling is difficult). Additionally, the interdependencies in the M, C, and V layers limit the ability for reuse (e.g., there are platform and presentation dependencies). Thus, the creation of applications with MVC has traditionally only partly met the design goals of MVC.

One area affected by the above limitations of current technology is with the introduction of enterprise service architecture (ESA) into the enterprise. Service-oriented architecture (SOA) has enabled platforms to deconstruct database-oriented business applications into highly flexible chunks of content and functionality that reflect the context of business situations better than previous monolithic applications. With ESA, business applications resemble more a bundle of resources than a monolithic transaction or application. The advent of ESA also coincides with the fact that applications and functionality are being applied to multi-channel, multi-modal occasionally connected (OCA) user experiences. Current solutions are either built on the monolithic application approach, or built as compositions of UIs tightly coupled to specific UI channels. That is, data are bound to UI components and floorplans to arrange business content to serve specific scenarios, but each must be separately developed for each scenario, and each UI channel. There is a resulting lack of re-use of screen-oriented service compositions, and a lack of multi-channel accessibility.

Although users expect pervasive access to business context data, traditional systems do not support the providing of information and tools for multi-channel, multi-modal OCA user experiences. Users have traditionally had to adapt expectations and behavior to deal with limited connectivity, limited access to data, and limited ability to perform work on tasks. The simple fact that applications for different channels have had to be re-implemented from scratch for each channel has significantly reduced the possibility of consistency of user experience across channels.

SUMMARY

Methods and apparatuses enable generation of data objects having properties that reflect business understanding and how the data objects are to be used. Thus, a data object incorporates domain knowledge for a better user experience. A user experience data object ("UX object") is semantically defined by object characteristics including actions, attributes, and relations needed to incorporate the UX object into one or more user interface (UI) contexts. One or more UX object usages define object characteristics related to a specific context in which the UX object is to be accessed. The usage and UX object have decoupled business logic, and can be associated to enable a UX object to be incorporated into a UI component that allows access to the UX object. A usage has business logic decoupled from the UX object, and is associated with the UX object.

In one embodiment, the UX object and views and usages of the UX object are defined in a development environment. The UX object and usage are instantiated and associated. The UX object and usage can then be provided as reusable UI component building blocks. Different usages of a UX object would provide for different visualizations in the UI. Thus, in one embodiment, the usage can be considered to perform a filtering function to define what aspects of the UX object will be displayed.

In one embodiment, the UX object has a semantic definition that is based on a business understanding of what a user will do with the UX object. Such understanding can include domain knowledge that indicates a perception of the UX object within a business domain.

In one embodiment, the UX object is bound to a backend system. Thus, in contrast to traditional objects that are instantiated at runtime and bound within a UI to a backend, the UX object itself can be bound to the backend, and any UI component that incorporates the UX object can leverage the binding.

In one embodiment, the UX object and usage are reusable in that different usages can be applied to the same UX object, and a single usage can be applied to different UX objects. That is, a subset of object characteristics of a first UX object and a subset of object characteristics of a second UX object may match the object characteristics defined by the usage. Additionally, first and second usages defining object characteristics related to specific contexts can be separately applied to a UX object, where the object characteristics defined by the first usage and the object characteristics of defined by the second usage are included within the object characteristics defined by the UX object.

In one embodiment, a runtime aspect enables defining an object container representing a UI context in which to provide views of one or more objects. Logic is included within the container to enable invoking a UX object and a usage from the container. Thus, the container can incorporate the UX object and the usage as reusable building blocks. A UI component is generated in the container to provide a visualization of the UX object, with only object characteristics defined in the usage. Thus, viewing and accessing the UX object is limited to what is defined for the particular usage, and other aspects of the data (which are extraneous relative to the particular usage context) are not present. The data object will still have the other aspects of data, which may be accessible in other usages.

In one embodiment, an end-user application may be defined through transitions between different views of the UX object, or views on related UX objects.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
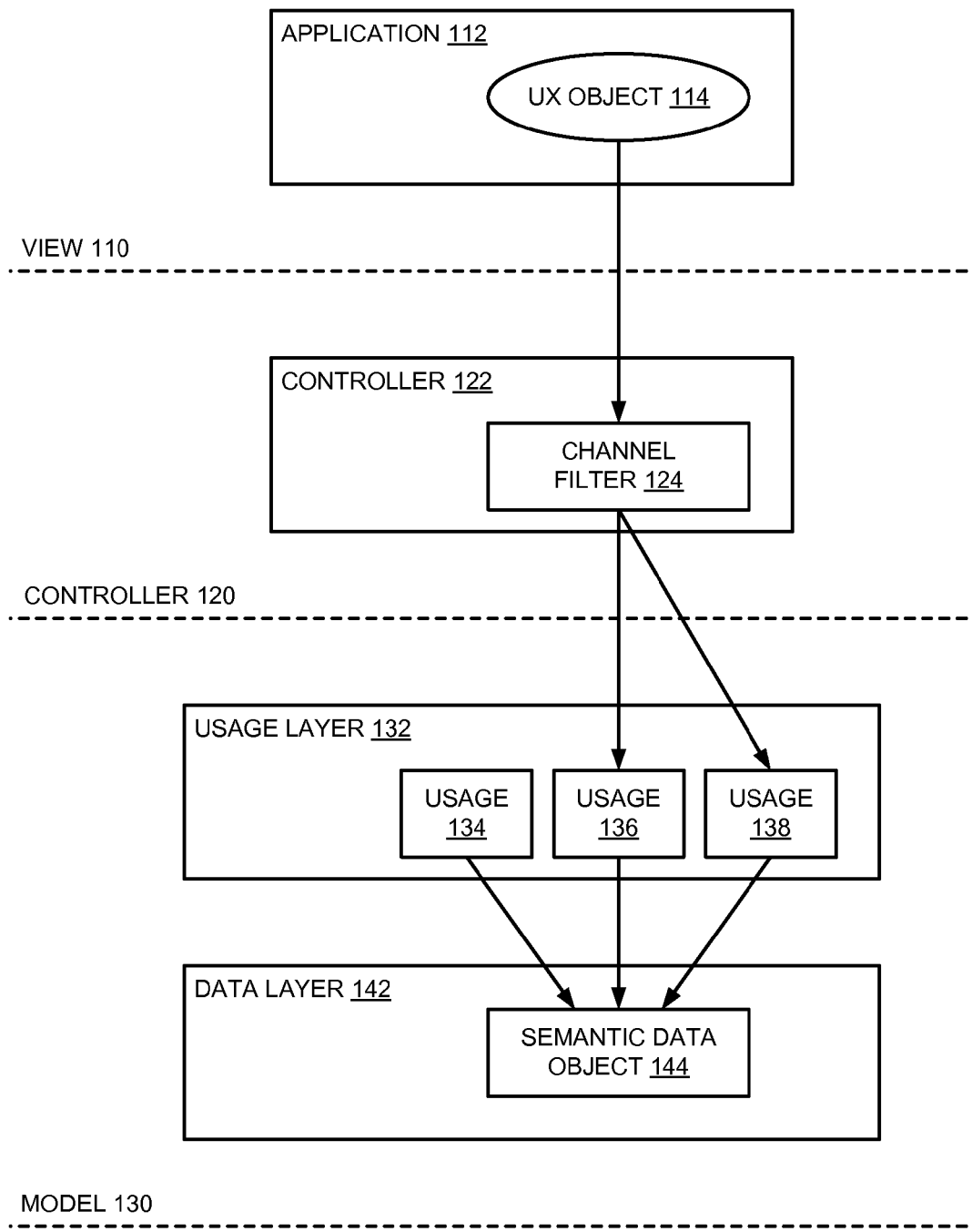
FIG. 1 is a block diagram of an embodiment of an architecture that separates a data model from controller and view logic.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

In one embodiment, consider a two-layer approach to providing data to be viewed and accessed in a user interface (UI), where a first layer involves semantically modeling data that is relevant for the user experience, and a second layer involves defining consumption of the data. The first layer includes user-experience (UX) object models that store semantics that describe how the UX object is to be consumed by end users. The description of how the UX object is to be consumed by the end users involves incorporating the knowledge of business domains into the UX object. That is, experience suggests how end-users expect to be able to access data, what they expect the data to show, and what they expect to be able to do with the data. Such domain knowledge is accounted in the definition of the UX object. The resulting UX object is thus modeled semantically, basically defining the contents of the UX object by the expectations (i.e., what the object "should mean" from the perspective of its users), rather than simply what contents a developer thinks the object should have. Note the difference between the definition of a UX object as described, and a traditional object, which may be referred to as a "technical object" that persists data in the backend or supports application logic. The technical object is defined in terms of its technical contents, and use and access of the data is limited to interaction with the technical contents. UT definitions are generated to define interactions with the technical object.

The UX object is generated from a data model that contains related actions, related entities, relationships, and reusable usages of the object. A reusable usage is related to how data is presented and viewed (e.g., a view in an MVC model), as described in more detail below. However, a usage is not a UI definition, rather a content definition. The reusable usage specifies content for different types of views. A UX object has different usages that define what parts of the UX object should be used if the UX object is used in a certain manner. For example, a "list item view" specifies what content of the UX object should be shown in a list item view and a "results list view" specifies what content of the UX object should be shown in a result list view. Similar usages can be established, for example, for a dashboard status view, a mini fact sheet, etc. In one embodiment, a reusable usage defines a mapping to a third party view of a known entity (e.g., a Personal Information Manager (PIM) entity, a MICROSOFT EXCHANGE entity, etc.).

Where the UX object and its contents may be understood as a first layer, the second layer referred to above defines consumption of the data. The second layer may be referred to as a usage layer. The usage layer defines the consumption of UX objects in the form of abstract building blocks, which are related to UI contexts in which a UX object may be accessed. The abstract building blocks may be UI patterns or UI frames with one or more types of usages that can be inserted in to the patterns. For example, UI contexts could include inbox, context inspection, KPI (key performance indicator) dashboard, search, etc., that have UI patterns and usage types related to the contexts. Such UI patterns can be building blocks that provide a standard content template to be filled with content available in UX objects. For example, a business analyst may construct an "Inspection Template" for a sales representative out of the UX object semantics for a Customer Business Object. The Inspection Template defines what a sales representative (i.e., any sales representative, generally) should be able to see and do when looking at Customer Information. Examples of UI contexts may further include a mobile device UI platform that provides content to a user on a mobile device, or a business application UI that provides content in the execution of the application.

MVC architectures have traditionally only provide for end-user semantic understanding in specific presentation and/or channel-specific UI design. In contrast, UX objects decouple the modeling of end-user related semantic understanding from the presentation or channel specific layer and allow very quick construction of UT component building blocks. Reference to different channels refers to the concept of data access in various different application types on a single device, and/or data access on different device types (e.g., mobile phone versus a desktop computer). The UX building blocks are abstract from the perspective of the presentation layer, which allows for the UX building blocks to decouple the definition of concrete content and role-dependent views from the presentation layer. In one embodiment, content templates according to the UX objects described herein can be the model (M) aspect of a traditional MVC UI pattern. Alternatively, the content templates may be consumed by an active client that has interfaces to directly process and use the data.

In one embodiment, reusable usages for the UX objects allows the deployment of content changes into different usages, which are then automatically propagated from the data layer to the presentation. For example, if a list view is changed, all presentations (e.g., UI patterns) using the usage type will be changed corresponding to the updated version of the usage (e.g., a list view will be updated to match a current list view type).

Thus, instead of tweaking abstract UT definitions into different channel-dependent user interfaces as traditionally done, the use of UX object with different usages allows a system to generate and send "raw" business context data (i.e., not processed for any particular presentation type) to a client. The client can then be fully responsible for creating the user experience by filtering and processing views on the data based on client capabilities. In such an approach, the model (M) aspect of a UI pattern or UI component generation architecture enables the pattern. The output is not a UI domain language, but a business or work domain language describing resources, views (through usages), and actions for a given business context. Client-side front ends consume data feeds that provide such raw business context data, and maximize the user experience on one device without being limited to cross-channel limitations. Unlike traditional business applications in which a UI pattern is part of a larger application, UX objects and UX usages enable activity-centric applications such as mobile applications, desktop widgets, or transient tasks opened from message inboxes, etc., can be built based on a selected set of compound UI building blocks.

FIG. 1 is a block diagram of an embodiment of an architecture that separates a data model from controller and view logic. Architecture 100 illustrates a modified MVC architecture for UI component generation. Traditionally MVC architectures have interdependency between the various layers. Architecture 100 includes view layer 110, controller layer 120, and model layer 130. Model layer 130 provides the underlying data that is presented to a user for access or interaction via view 110. View 110 provides UI components to provide the access to a user. Controller 120 provides business logic to handle interaction with the object as provided in the UI components of view 110.

One difference between architecture 100 and traditional MVC architectures includes the separation of model 130 into usage layer 132 and data layer 142. Note that although it is spoken of in terms of different layers, the different layers are conceptual, and represent different functions that are provided at the layer of model 130. Usage layer 132 includes various usages 134, 136, and 138, which each represent a context in which data may be accessed. Thus, each usage represents a different scenario where a UX object may be accessed. The different usages 134-138 may differ only slightly in how the UX object is accessed, or they may differ significantly. The amount by which the usages differ refers to the amount to which the usages define overlaps of object characteristics of the UX object. For example, if a UX object includes characteristics 1-10, two usages may define use of characteristics 1-5 and 2-6, respectively, which another usage may define use of characteristics 1, 4, and 7-10.

Model 130 includes data layer 142, which includes semantic data object 144. Semantic data object 144 represents a UX object as described herein. Data object 144 is semantic because the content of the data object is defined in a way that reflects the business understanding of how the object is to be used. For example, semantic data object 144 may include actions, attributes, and relations similar to any technical data object. However, there may be certain actions, attributes, and/or relations included within semantic data object 144 to support certain contexts in which it will be accessed. Consider a Customer object that has additional actions determined useful for technical support functions, or that has additional relations considered useful for sales functions. While the data itself may simply more and/or different data than present in some other data object definition, the fact that semantic data object 144 is defined with the particular object characteristics enables use of the data in different ways. The access to the data object can be more activity-centric, and more focused on how the user will use the data object. Specific scenarios will not require extensive custom, non-reusable application logic because access to particular object characteristics would then only require certain views on the data for particular UI contexts.

As mentioned above, application logic can be simplified when the data objects incorporated into the applications already are focused on what the business tasks of the data objects will be. Thus, application 112 in the architecture layer of view 110 will tend to include more reusable components than traditional business applications, and will be simpler in terms of its business logic than previous business applications to accomplish the same tasks. UX object 114 of application 112 represents an instantiation of semantic data object 144. In one embodiment, UX object 114 is not a locally generated and locally stored/maintained instance of semantic data object 144. Rather, UX object 114 is an instance of the backend object, and access to and operation on UX object 114 is operation on the backend data.

At architecture layer controller 120, the controller logic may also be simpler than control logic of traditional MVC patterns. Controller 122 need not be as complex, at least because the object data does not need to be custom processed to apply to different UI channels. Usages 134-138 define the UI context, and the views associated with semantic data object 144 define how the data is viewed and accessed. Thus, controller 122 may simply provide an object container from which objects and usages are invoked. Channel filter 124 represents logic that defines what is the channel type for application 112. Channel filter 124 may be a logical composite of information related to the selection of usages 134-138 and views of UX object 114.

Note that as depicted in the example provided, UX object 114 is a UX object generated from semantic data object 144, with usages 136 and 138 that can apply to the object on the particular channel of application 112. Either because the usage is not supported on the particular channel specified by channel filter 124, or because the usage applies to other semantic data objects but not semantic data object 144, usage 134 is not available.

Figure 2:
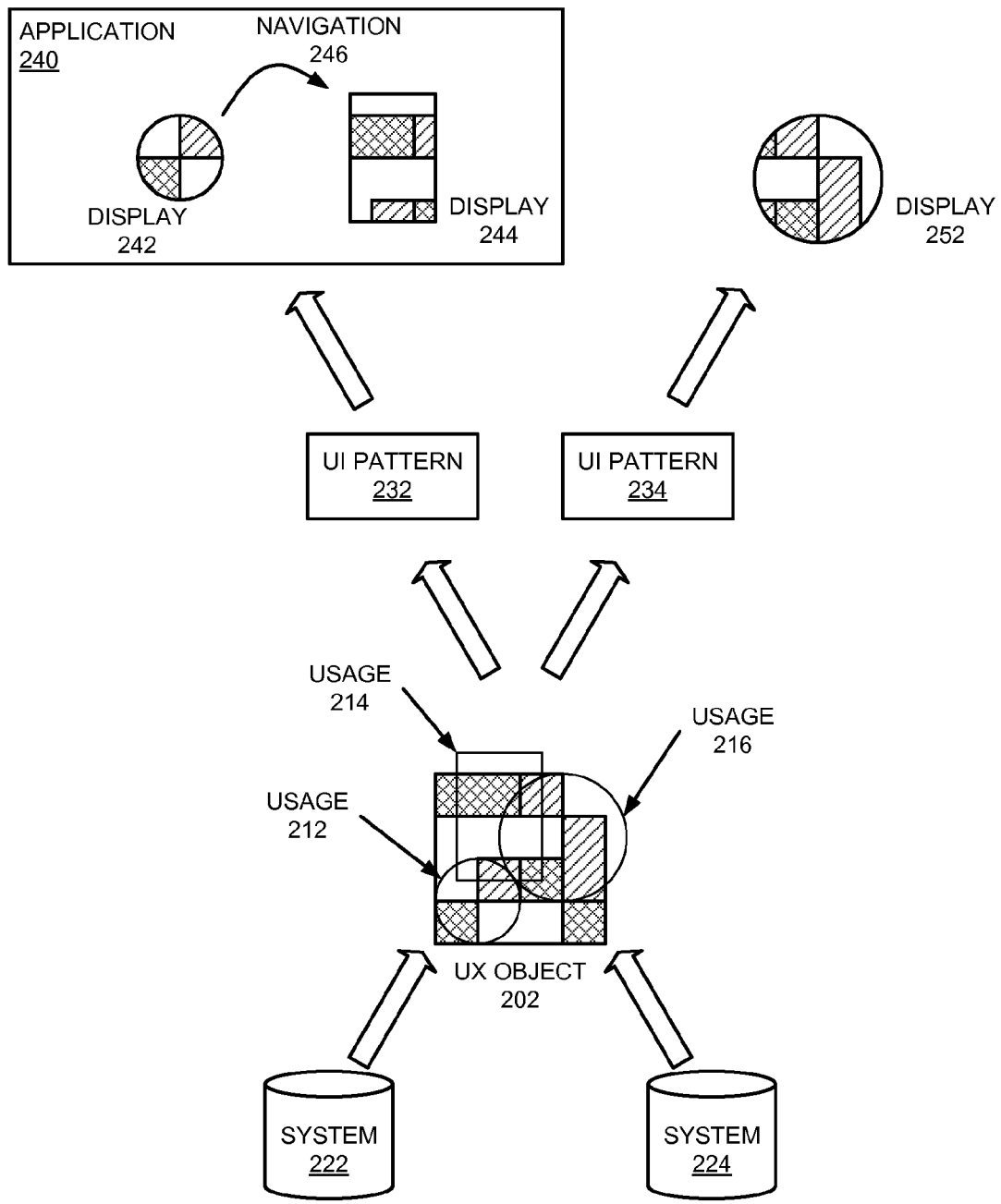
FIG. 2 is a block diagram of an embodiment of a user experience data object.

FIG. 2 is a block diagram of an embodiment of a user experience data object. System 200 represents an environment in which a UX object may be used, such as an enterprise system. An enterprise system as referred to herein is an example of any type of system having "backend" data that is accessed by "frontend" applications. Frontend refers to systems and applications at the user end, or accessible locally to a user on a client device. Backend refers to systems and applications that are accessible remotely from the client device, and are typically accessed via one or more enterprise networks, which may include firewalls or other security mechanisms. Backend data is also referred to as enterprise-level data, which is available generally to users within the enterprise, based on privilege and security access, which is contrasted with local data stored on a user's client device.

UX object 202 is an example of a UX object according to any embodiment described herein, and is generated from elements from one or multiple backend systems 222-224.

That is, object characteristics of UX object 202 may be obtained from multiple sources. In one embodiment, the different elements may be obtained through one or more services (e.g., web services) in the enterprise. For purposes of illustration, UX object 202 is represented having various blocks put together to represent the object as a whole. UX object 202 is depicted with various associated usages 212-216. The usages may be considered from one perspective as selective filters on content present in UX object 202. The usages define what object characteristics (e.g., attributes, actions, relations) are available for particular UI contexts. As graphically depicted in FIG. 2, each usage 212-216 is represented as a shape that overlaps a portion of UX object 202.

UI patterns 232-234 define UI contexts in which UX object 202 may be accessed. As used herein, a UI context refers to a situation or scenario in which a UX object may be accessed. The situation may include a business purpose or business situation in which the particular object will be used. For example, a Customer object may be serve different purposes when used in a Sales scenario that when used in a Product Support scenario. In one embodiment, a usage specifically does not have any channel-specific definitions. That is, the UI pattern is generic across all channels, and the client that is accessing the UX object is responsible for determining what is to be displayed and how. A UI pattern could be defined with channel-specific definitions, but such an approach would reduce the effectiveness of the modified MVC architecture that can be achieved with layers that are independent of each other.

Note that there is a relationship between usages and UI patterns, but the two concepts are distinct, as displayed in FIG. 2. The usage defines object characteristics that are applicable to a particular UI context. From the perspective of the UI pattern, a usage may be considered an object characteristic. The usage defines content specific to certain operations. A UI pattern may define several usages for the UI context. Thus, a usage type can be considered more generic than a UI pattern, with usage types generic across multiple UI patterns, and UI patterns generic across multiple business scenarios.

UI pattern 234 defines use of usage 216, which can be incorporated into a UI component for display. The resulting visualization may be display 252. UI pattern 232 is invoked by application 240 in the example of FIG. 2. Application 240 may use both usage 212 and usage 214 as different UI screens. Usages 212 and 214 may be different usage types related to the UI pattern. The resulting visualization would be display 242, which may be transitioned to display 244. As used herein, the transition is caused by navigation 246, which represents some action by the user (e.g., a mouse or pointer click/activation, pressing a key or button, inputting text, tapping a touchscreen, etc.). Thus, application 240 presents display 242, receives user input, and navigates to display 244. The navigation model of application 240 is contrasted with current approaches to applications. Current applications (even web browsers) have a specific set of functions or actions that can be performed. Changing the content does not change the functionality of the application. In contrast, the functionality of application 240 can be dynamic, because each display 242-244 has associated content and functionality. Thus, the available actions and functionality of application 240 are dynamic with the navigation from one view to another. Rather than defining functionality of an application and feeding content to the application, application 240 can be defined as an application by the navigations, rather than available functionality. Application 240 becomes something of a meta-model of the navigation of content associated with UX object 202 and its related UX objects.

Figure 3:
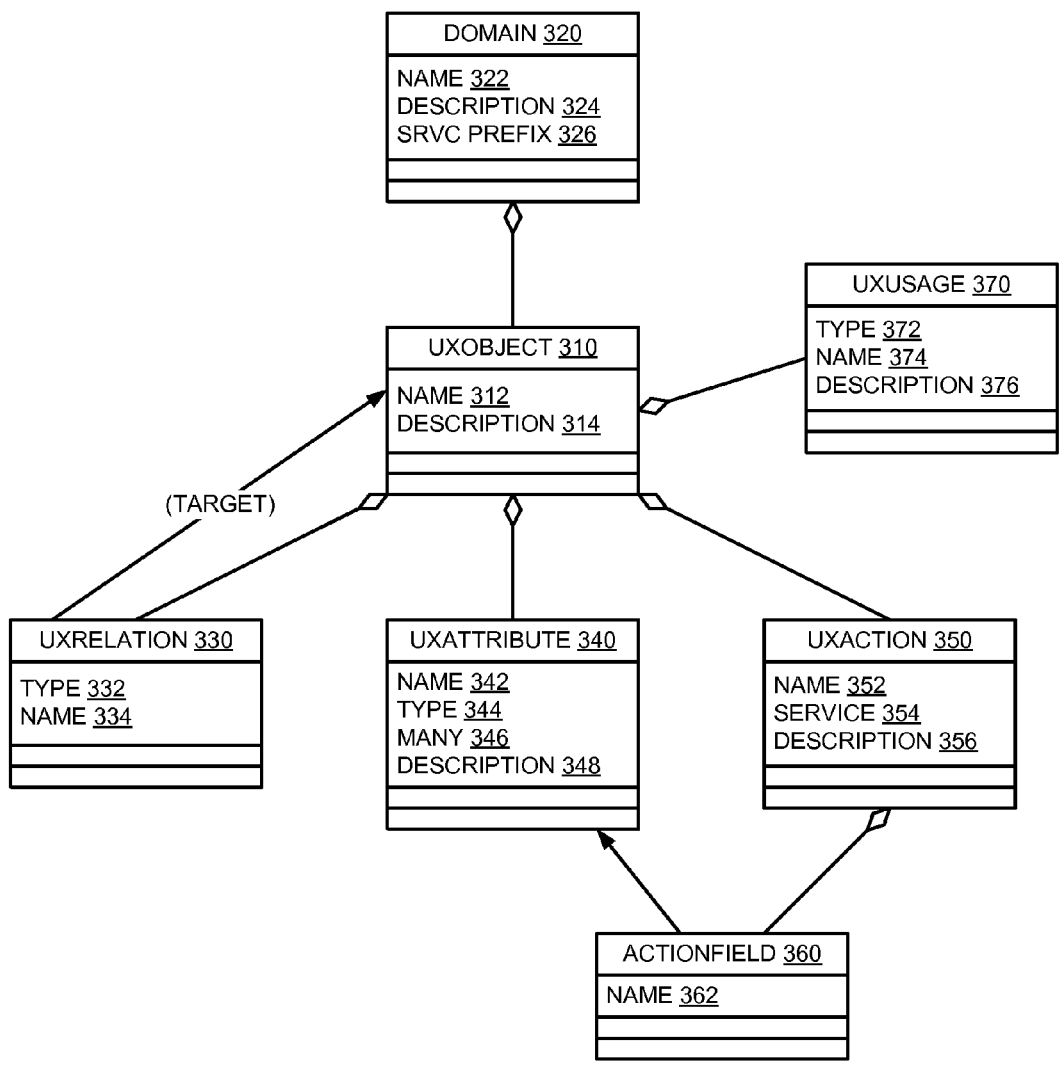
FIG. 3 is a block diagram of an embodiment of a user experience data object model.

FIG. 3 is a block diagram of an embodiment of a user experience data object model. Model 300 represents a model of a UX object according to any embodiment of a UX object mentioned herein. UX object 310 includes name 312, which is an identifier for UX object 310, and description 314, which includes data values, parameters, or other content that makes up UX object 310. Objects may be part of a particular domain 320, which represents a system (e.g., CRM (customer relations management), HR (human resources), etc.) or entity (e.g., a particular subsidiary, department, trading partner in a grid, etc.) to which the object belongs. An object belongs to a system that hosts the object and persists and maintains the object. Regarding the lines connecting various elements of FIG. 3, the line with an arrow represent a relationship from the pointed to element to the pointing element, while the line with the diamond represents a one-to-many association between the element that the diamond touches (the one) to the element the plain end of the line touches (the many). For example, domain 320 may have many associated UX objects 310, and each UX object 310 will have one specific domain 320.

Domain 320 includes name 322, which is an identifier, description 324 and service (srvc) prefix 326. Description 324 represents content describing or defining the domain, and service prefix 326 represents an access mechanism. That is, the prefix helps address calls to the specific domain for content, such as UX object 310. In one embodiment, the identifier for UX object 310 would be {domain.serviceprefix}.{domain.name}.{uxobject.name}.

UX object 310 may have one or many UX relations 330, one or many UX attributes 340, one or many UX actions 350, and one or many UX views 370. UX relation 330 includes type 332 and name 334. Name 334 identifies the particular relation, while type 332 indicates a class of relationship between UX object 310 and a related object. Relationship type 332 will have inherent characteristics regarding what can be done with the relationship, or what will be done as a result of the relationship existing (e.g., loading one object when the related object is invoked). UX object 310 is a target of all relations 320 included in UX object 310, just as the related object would identify the same relation 320 and also be a target of the relation.

UX attribute 340 includes name 342 to identify the attribute, type 344 to indicate the type of attribute, many 346 to indicate whether the instance of the attribute is an array or a single attribute, and description 348 defining its content.

UX action 350 includes name 352 to identify the action, and description 356 to define the content of the action (e.g., logic that provides the functionality provided by the action). UX action 350 may include service 354 to indicate a service that may be invoked to perform the action. That is, actions are generally performed by services in an SOA environment. Action field 360 includes name 362, and is a parameter for service 354 of UX action 350. There may be multiple action fields 360 associated with service 354. If UX action 350 is activated, the corresponding service 354 should be started, and the parameter(s) of action field(s) 360 should be provided to the service as input. Note that an action generally references a particular attribute of UX object 310, as indicated by the arrow from action field 360 to UX attribute 340. Generally attributes are accessed, changed, deleted, or otherwise operated on by actions. Name 362 of action field 360 will indicate the referenced attribute as well as the name of the action, while service 354 defines the logic to perform the action.

Traditional objects may include relations, attributes, and actions. However, the relations, attributes, and actions included in UX object 310 are included based on knowledge and expectation about the use of UX object 310. Additionally, UX view(s) 370 are associated with UX object 310, and define particular content for particular reusable UI scenarios. The inclusion of particular relations, attributes, and actions, the definitions of those elements, and the inclusion of particular views reflect the semantic definition of UX object 310. The knowledge about which elements to include and how to define them represents the domain knowledge that drives the definition of UX object 310.

UX usage 370 most specifically defines particular content of the actions, attributes, and relations needed to incorporate UX object 310 into any of a number of UI contexts from which UX object 310 will be accessed. UX usage 370 includes type 372 to define the type of view (e.g., list view, search results, status or reporting views, etc.), name 374 to identify UX view instances, and description 376 that defines the content to be included in the particular view type. From one perspective, UX usage 370 acts as a visualization filter for UX object 310, including logic that will selectively define which object characteristics to associate with a particular view. Other object characteristics, while still present in UX object 310, will be unviewable and inaccessible to a user if the view does not define them as being part in the particular view.

Figure 4:
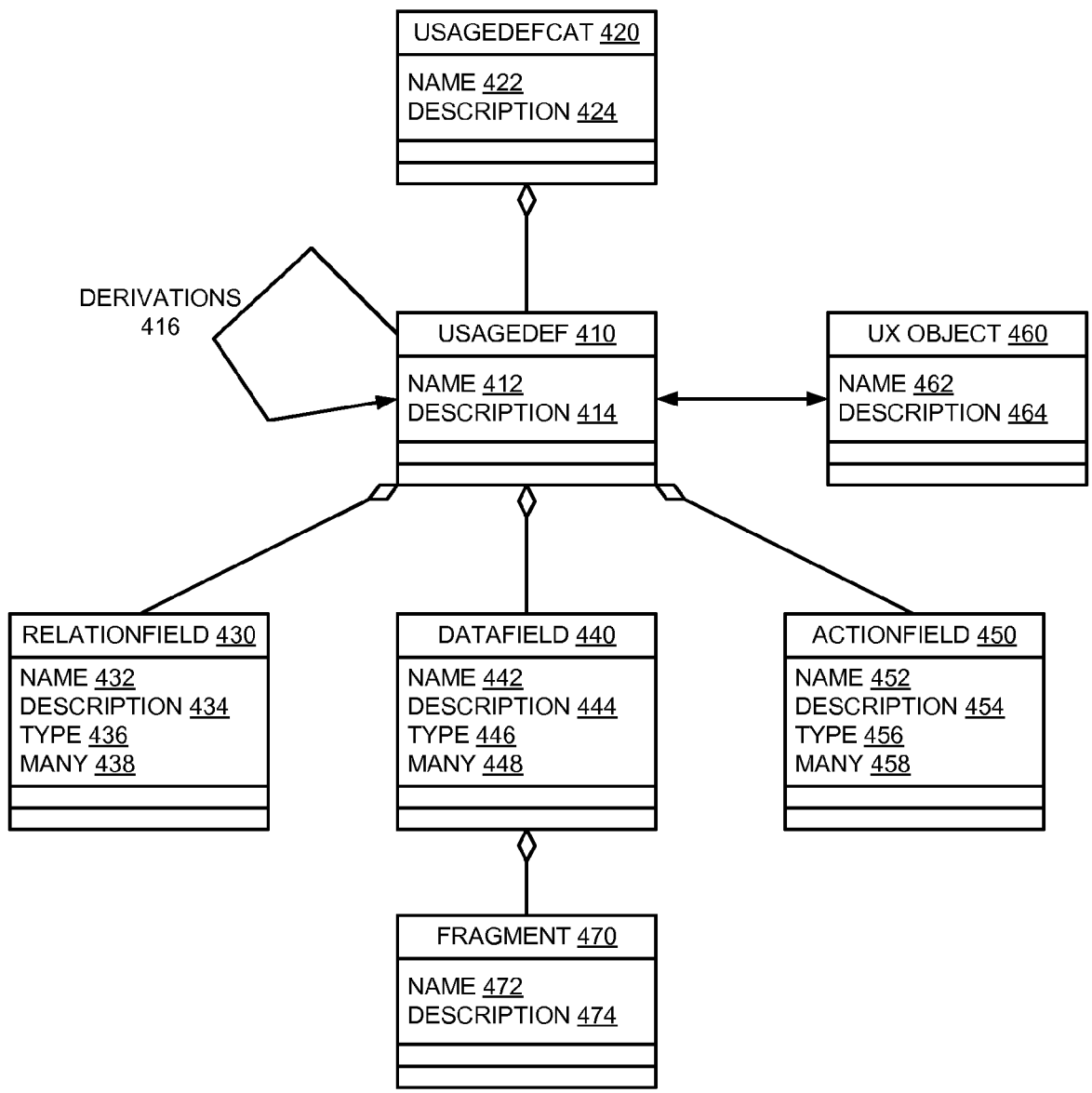
FIG. 4 is a block diagram of an embodiment of a user experience usage model.

FIG. 4 is a block diagram of an embodiment of a user experience usage model. Model 400 represents a model of a UX usage according to any embodiment of a usage referred to herein. For convenience, the UX usage will simply be referred to as a "usage," which will imply a usage for UX objects. The line and arrow conventions for FIG. 4 are the same as for FIG. 3, where a pointed arrow represents a relationship or a reference to a pointed to element, and where the lines with diamonds represent one-to-many relationships. FIG. 4 also includes a line with arrows at both ends, referring to the association of the usage with a UX object, as described more below.

Model 400 includes usage definition (usagedef) 410, which represents the usage referred to herein. Usage definition 410 include name 412 to identify the usage, and description 414 defines the usage. Usage definition 410 includes one or many relation fields 430, one or many data fields 440, and one or many action fields 450. Relation field 430 provides a mechanism for accessing UX relations (e.g., UX relation 330 of FIG. 3). Relation field 430 includes name 432 to identify the relation, description 434 to define the relation, type 436 to identify a class or type of the relation, and array 438 to indicate whether the relation is part of an array, or whether it is a single instance. Data field 440 provides a mechanism for accessing UX attributes (e.g., UX attribute 340 of FIG. 3). Data field 440 includes name 442 to identify the attribute, description 444 to define content of the attribute, type 446 to identify a type or class of the attribute, and array 448 to indicate whether the attribute is part of an array of attributes, or whether the attribute is a single instance. Action field 450 provides a mechanism for accessing UX actions (e.g., UX action 350 of FIG. 3). Similarly, action field 450 includes name 452 to identify the action, description 454 to define content of the action, type 456 to identify a type or class of the action, and array 458 to indicate whether the action belongs to an array, or whether the action is a single action. In one embodiment, data field 440 has one or many data fragments 470. Data fragment 470 includes name 472 or other identifier (e.g., a code, hash, or numeric value), and description 474 that describes the data fragment. Data fragments may be elements of data that are related to a particular attribute.

As mentioned above, usage definition 410 is associated with UX object 460. Technically, usage definition 410 could be associated with multiple UX objects, and thus there could be a line between the two with a diamond on usage definition 410. However, the line with arrows on either end is intended to demonstrate that an association is generated between a usage and a UX object, and is represented by the line. UX object 460 includes name 462 or an identifier (which may include its domain), and description 464. UX object 460 is an example of UX object 310 of model 300 of FIG. 3.

Usage definition 410 has a source identified by usage definition catalog (usagedefcat) 420. Usage definition catalog 420 is a repository of usages, and thus may contain multiple usages. At its core, usage definition 410 defines an interface for an application model that will invoke the usage. An application model may be limited to usage definitions that are part of a single usage definition catalog. Thus, usage definition catalog 420 may define what usages are available to a particular business application being developed. Usage definition catalog 420 includes name 422 to identify the catalog, and description 424 to define the catalog and its contents.

In one embodiment, model 400 includes derivations 416. By specifying one or more derivations 416, usages instantiated from model 400 can be extended, which may eliminate the need to specify equivalent fields for each instance. Although fields may thus have a "default," they may still be overwritten. For example, consider a usage with a DataField "Title" for a ListUsage and a SpecialListUsage. The SpecialListUsage instance can be derived from ListUsage, and include the same attributes of ListUsage, and have additional attributes. Thus, each attribute can be defined independently in both usages, or the fields can be derived.

Note that the various attributes of usage model 400 (relation field 430, data field 440, and relation field 450) have logic defined in their respective descriptions. The logic defined for each is the business logic of the attributes, which collectively make up the business logic of a usage instantiated from model 400. Thus, the usage has business logic that is decoupled from any particular UX object, but that allows the usage to work together with UX objects. The attributes of the usage define the mechanisms available to the usage, which defines the attributes or object characteristics of a UX object that are accessible under a particular usage.

Figure 5:
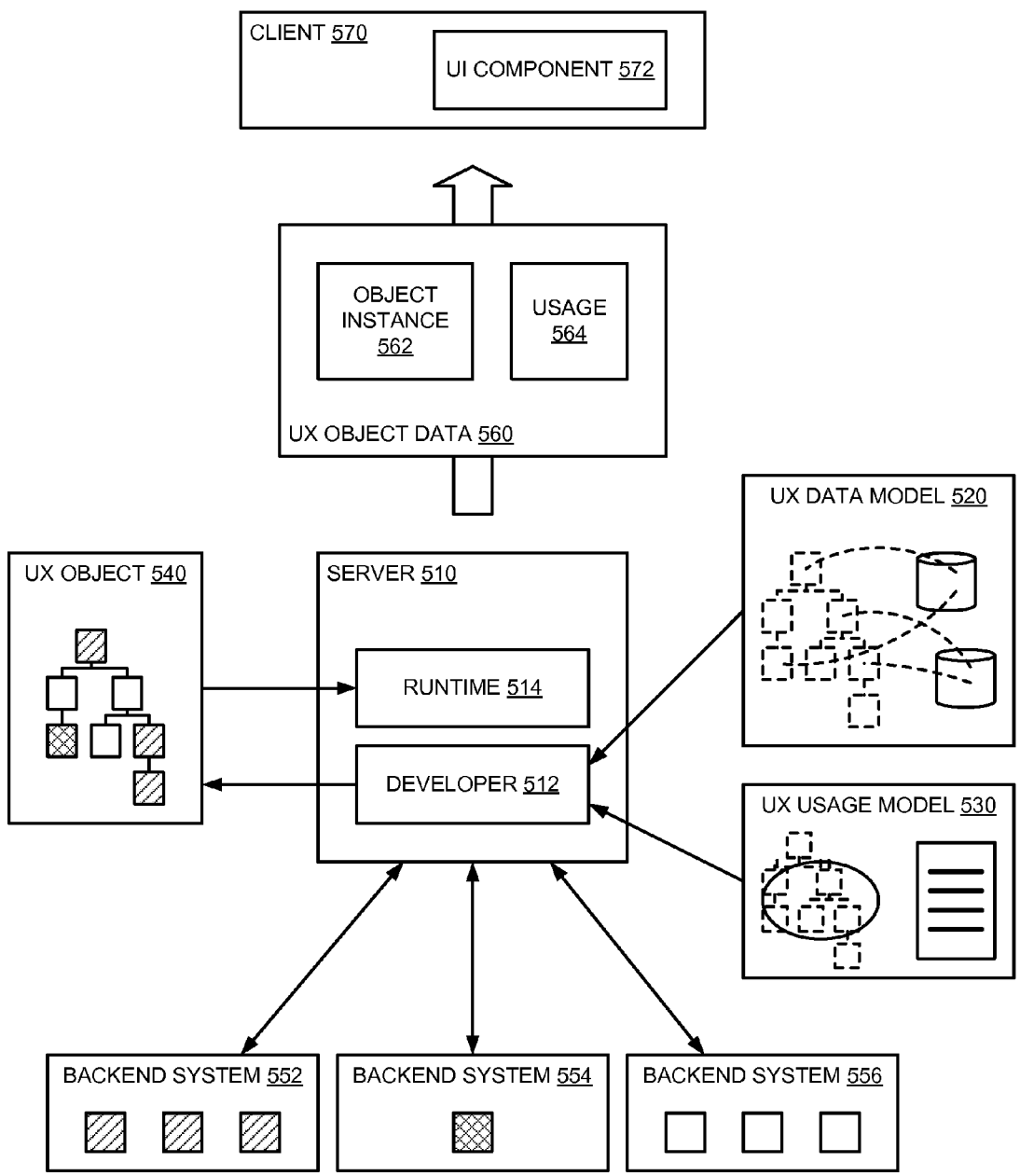
FIG. 5 is a block diagram of an embodiment of a system that generates a user experience data object for consumption by a client.

FIG. 5 is a block diagram of an embodiment of a system that generates a user experience data object for consumption by a client. System 500 represents an example of a server-client system, where the server generates and serves a UX object as described herein, and the client receives the UX object data. In one embodiment, client 570 is an active client, which has interfaces to directly operate on raw business data presented in a UX object. The active business client can thus directly operate on actionable context data or meta object, as well as interpret the data at runtime and generate a channel-specific UI to access and navigate UX objects. In one embodiment, the business context of the data associated with the UX object is a UI context, and data is selectively and progressively provided via client 570 to a user. The data can be sent as traditionally performed through requests, or client 570 can be a data feed consumer. Client 570 can be embodied in any of a number of end-user devices, including desktop or laptop computers, handheld devices, mobile wireless devices, etc. Client 570 includes UI component 572 that is generated to display data received (e.g., the UX object described below).

Server 510 is a backend system that generates and provides UX objects. Server 510 includes developer environment 512 and runtime environment 514. Developer 512 enables the generation (creation of the model and/or instantiation of an object from a model) of UX object 540. Runtime 514 enables the execution of the instance, and enables server 510 to pass UX object data 560 to client 570.

As illustrated, in one embodiment, UX object 540 is generated by access in developer 512 to various different components of various different backend systems 552-556. In one embodiment, accessing the various different data components, and/or incorporating the data components into a meta object instance includes binding the data component to the respective backend system from which it is derived. Thus, the interfaces and services related to the data components will become part of the UX object 540. The components will then not need to be separately bound to the backend.

UX data model 520 is an example of model 300 of FIG. 3, and includes mapping rules between the backend data of systems 552-556, as exposed through services, and UX object 540. The mappings can indicate what data elements from what systems are to be used for which structural elements of the UX object. The concept of the mapping of elements is depicted graphically in the representation of UX data model 520. Similarly, UX usage model 530 is depicted graphically, with shapes to represent a particular a view (the oval shape over a model of a UX object) and a content description. UX usage model 530 is an example of model 400 of FIG. 4, and includes a description of content for one or more views associated with a particular UI context.

Server 510 provides UX object data 560, which includes object instance data 562 and usage data 564 to client 570. The raw business data provides everything client 570 needs to provide a visualization of the data to a user.

Figure 6:
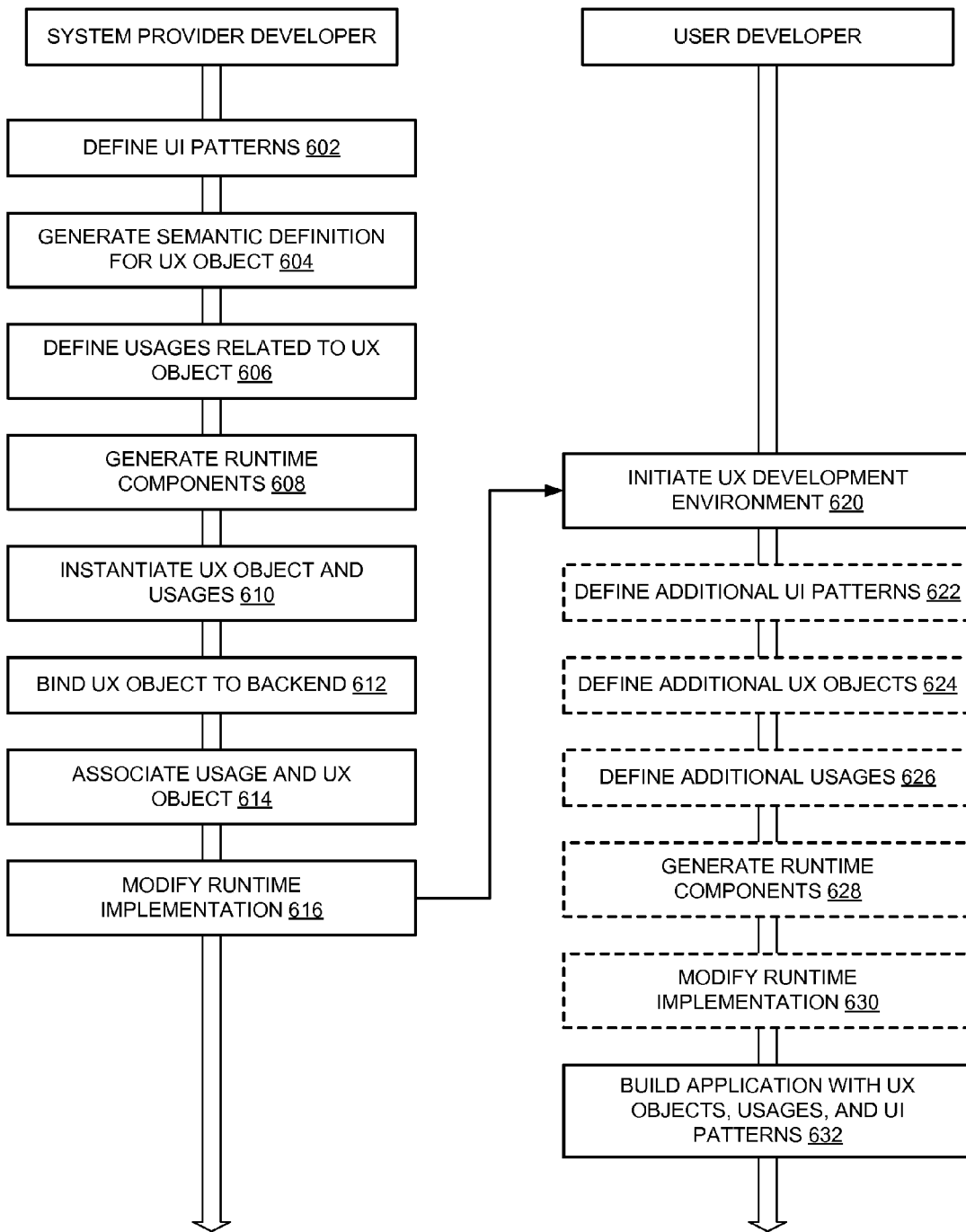
FIG. 6 is a flow diagram of an embodiment of a process for generating a user experience data object.

FIG. 6 is a flow diagram of an embodiment of a process for generating a user experience data object. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

In one embodiment, development of a UX object can be considered to occur between two separate entities: a system provider developer and a user developer. The system provider developer is a developer that generates UX objects as part of inclusion in enterprise system components generated by an enterprise system provider. The user developer works on the enterprise system and may generate content within the system. The system provider may be considered a content provider, and the user a customer of the system provider. In one embodiment, UI patterns and usages are provided as part of a development/implementation toolbox by the system provider to the user. The user may generate additional UI patterns and usages. The UX objects can be provided as part of the toolbox, and/or be developed by the user. Thus, the flow diagram represents a system provider developer that generates components that would be created, and then generated and optimized as runtime components when the underlying system (e.g., the enterprise system) is executed and worked on by the user. The user developer can modify, add, and combine components in a development environment of the underlying system.

A system provider developer defines one or more UI patterns, 602. There may be many UI patterns for a system, depending on what UI scenarios are to be included within the system. The system provider developer generates a semantic definition for a UX object, 604. The semantic definition provides the content of the UX object, but in light of how the object is to be used. There may be many UX objects that would be applicable to any given UI pattern scenarios. Many of the UI pattern scenarios may reuse the same UX objects. The system provider developer also generates one or more usages related to the object, 606. The usage describes what object characteristics will be seen in what context of UIs. The process of generating usages and defining the content of the UX object that belongs to the usage can be repeat for all usages related to a UX object. Just as multiple UX objects can be related to a single UI pattern, and may be reused, the same is true for usages. There may be multiple usages for a single UI pattern, and multiple UI patterns may reuse usages. Each of the UI patterns, UX objects, and usages may be models that are reused.

The system generates runtime components as part of the execution of the system, 608. Included in generating the runtime components may be that the system instantiates a UX object and usages, 610, from the object model and the usage models. The instance may be created in response to a particular operation by a user in a frontend client. In one embodiment, the system binds the UX object to one or more backend system resources (e.g., services) as part of instantiating the object, 612. To create the user experience described herein, each object is associated with at least one usage, 614. The system can modify the runtime implementation, 616, by so-called "optimization techniques" performed on the runtime components to remove and/or add elements that speed up performance, reduce memory usage, etc., as is understood by those of skill in the art. The system provides the UI patterns, UX objects, and usages to a client device for interaction with a user.

A user developer initiates a user experience development environment, 620. The development environment may have little or no modification from known development environments. The development environment executes on the system, and provides an area to modify and add components to the runtime system. Thus, as needed for particular implementations, a user developer may perform none, some, or all of defining additional UI patterns, 622, defining additional UX objects, 624, and defining additional usages, 626. In addition to adding components, the user may modify existing components, or make modified copies of existing or toolbox components. The process of defining these components may mirror how the components are defined by the system provider developer.

The user developer would then generate runtime components, 628, from the additional/modified UI patterns, UX objects, and/or usages. These components may also be modified in a runtime implementation, 630, similar to what is mentioned above. The user developer may then build applications with the UX objects, usages, and UI patterns existing in runtime implementations, 632. The generation of applications is further discussed below with respect to FIG. 7.

Figure 7:
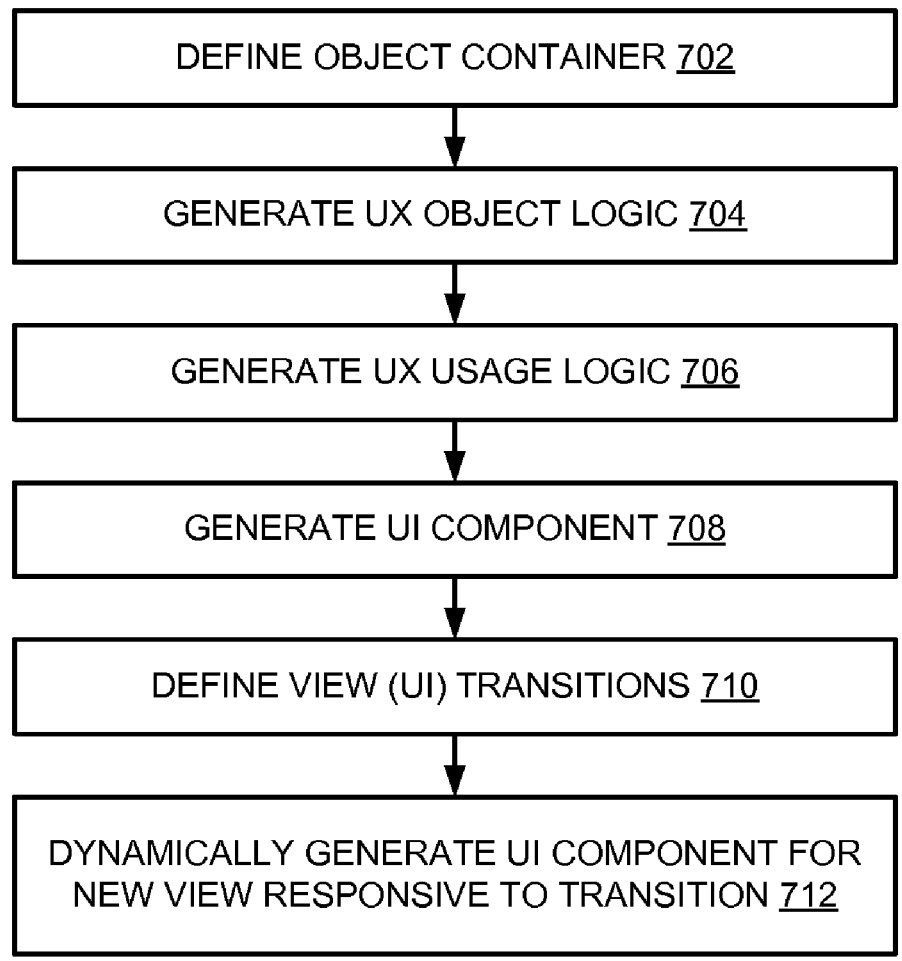
FIG. 7 is a flow diagram of an embodiment of a process for consuming a user experience data object.

FIG. 7 is a flow diagram of an embodiment of a process for consuming a user experience data object. Controller logic defines an object container, 702. The controller is the "C" component of an MVC pattern, where the "M" component is a UX object and UX usage as described herein. The object container will hold UX objects and UX usages. The system generates UX object logic, 704, to enable the object container to invoke a UX object. The system generates UX usage logic, 706, to enable the object container to invoke a UX usage. The controller can then create a UI component, 708, as the "V" component of the MVC pattern, where the UI component displays a UX object. The UX object as displayed in the UI component is limited to the object characteristics defined in the associated UX usage in the container.

In one embodiment, the controller defines view transitions from one view or UI presentation of the UX object to another, or from a view or UI presentation of the UX object to another related UX object, 710. Thus, rather than defining application functionality, different views of data providing different data access, functionality, available operations, etc., are enabled by transitions from one view to another. In this way, the system semantically defines an end-user application by way of transitions. The system then dynamically generates a UI component for a new view responsive to a transition triggered by interaction with a user, 712. Such dynamic view transitions continue until the user determines that all work with respect to the UI context is complete, and terminates the "application" of transitioning or navigating the data.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable medium may cause a machine to perform the functions or operations described, and includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method comprising:
   instantiating a user experience data object (UX) object having object characteristics, including content and functionality, available when presented in a user interface (UI), wherein an object characteristic is presented based, at least in part, on a UI context in which the UI is accessed;
   instantiating a UX object usage, the usage having business logic decoupled from the UX object, the instantiated usage identifying a first set of at least object characteristic related to a first UI context in which the UX object is to be accessed;
   associating the UX object with the usage, where the usage provides a filter to presentation of the first set of object characteristic(s) of the UX object, where the first set of object characteristic(s) are to be presented in the first UI context, and a second set of at least one object characteristic is to not presented in the first UI context; and
   providing the UX object and the usage for reusable incorporation into a UI component to present the UX object with only the first set of object characteristic(s) related to the first UI context in which the UX object is to be accessed based on the usage, the UX object capable of being associated with another UX object usage for reuse into the UI component to present the UX object to be accessed in a second UI context with the second set of object characteristic(s);
   instantiating a second UX object, where a subset of object characteristics of the first UX object and a subset of object characteristics of the second UX object match the object characteristics defined by the usage; and
   instantiating a second usage defining the second set of object characteristic(s) related to the second UI context, where the first object characteristic(s) defined by the first usage and the second set of object characteristic(s) defined by the second usage are included within the object characteristics defined by the UX object.

2. The method of claim 1, wherein instantiating the UX object comprises:
   instantiating a UX object defined based on an understanding of what a user will do with the UX object, including domain knowledge that indicates a perception of the UX object within a business domain.

3. The method of claim 1, wherein instantiating the UX object further comprises:
   binding the UX object to a backend system; and
   providing the bound UX object as a reusable building block for UI component generation.

4. The method of claim 1, wherein the one or more UI contexts comprise one or more of a mobile device UI platform, or a business application UI.

5. An article of manufacture comprising a non-transitory machine-readable storage medium having content stored thereon to provide instructions to cause a machine to perform operations, including:
   instantiating a user experience data object (UX) object having object characteristics, including content and functionality, available when presented in a user interface (UI), wherein an object characteristic is presented based, at least in part, on a UI context in which the UI is accessed;
   instantiating a UX object usage, the usage having business logic decoupled from the UX object, the instantiated usage identifying a first set of at least one object characteristic related to a first UI context in which the UX object is to be accessed;
   associating the UX object with the usage, where the usage provides a filter to presentation of the first set of object characteristic(s) of the UX object, where the first set of object characteristic(s) are to be presented in the first UI context, and a second set of at least one object characteristic is to be not presented in the first UI context; and
   providing the UX object and the usage for reusable incorporation into a UI component to present the UX object with only the first set of object characteristic(s) related to the first UI context in which the UX object is to be accessed based on the usage, the UX object capable of being associated with another UX object usage for reuse into the UI component to present the UX object to be accessed in a second UI context with the second set of object characteristic(s);

instantiating a second UX object, where a subset of object characteristics of the first UX object and a subset of object characteristics of the second UX object match the object characteristics defined by the usage; and instantiating a second usage defining the second set of object characteristic(s) related to the second UI context, where the first object characteristic(s) defined by the fist usage and the second set of object characteristic(s) defined by the second usage are included within the object characteristics defined by the UX object.

6. The article of manufacture of claim 5, wherein the content to provide instructions for instantiating the UX object further comprises content to provide instructions for binding the UX object to a backend system; and providing the bound UX object as a reusable building block for UI component generation.

7. The article of manufacture of claim 5, wherein the one or more UI contexts comprise UI building blocks that provide a standard content template to be filled with content.

8. The article of manufacture of claim 5, where the content to provide instructions for instantiating the UX object usage comprises content to provide instructions for instantiating a UX object usage derived from a source usage, the derived usage inheriting all content of the source usage, and customizable to overwrite the derived content.

* * * * *